(12) United States Patent
Wu et al.

(10) Patent No.: US 11,599,435 B2
(45) Date of Patent: Mar. 7, 2023

(54) FAILURE ANALYSIS SYSTEM FOR A DISTRIBUTED STORAGE SYSTEM

(71) Applicant: VMware, Inc., Palo Alto, CA (US)

(72) Inventors: Yu Wu, Shanghai (CN); Yang Yang, Shanghai (CN); Xiang Yu, Shanghai (CN); Wenguang Wang, Santa Clara, CA (US); Jin Feng, Shanghai (CN)

(73) Assignee: VMWARE, INC., Palo Alto, CA (US)

( * ) Notice: Subject to any disclaimer, the term of this patent is extended or adjusted under 35 U.S.C. 154(b) by 650 days.

(21) Appl. No.: 16/540,080

(22) Filed: Aug. 14, 2019

(65) Prior Publication Data

US 2020/0409810 A1    Dec. 31, 2020

(30) Foreign Application Priority Data

Jun. 26, 2019  (WO) ................ PCT/CN2019/093047

(51) Int. Cl.
*G06F 11/07* (2006.01)
*G06F 11/30* (2006.01)
(Continued)

(52) U.S. Cl.
CPC ...... *G06F 11/2257* (2013.01); *G06F 9/45558* (2013.01); *G06F 11/263* (2013.01);
(Continued)

(58) Field of Classification Search
CPC .. G06F 11/2257; G06F 11/263; G06F 11/301; G06F 11/1484; G06F 16/2246;
(Continued)

(56) References Cited

U.S. PATENT DOCUMENTS 9,069,737 B1 *  6/2015 Kimotho ............. G06F 11/0709
2015/0254145 A1 *  9/2015 Lachenmann ...... G06F 12/1491
711/6

(Continued)

OTHER PUBLICATIONS

N. L. Griffin et al., "A Rule-Based Inference Engine which is Optimal and VLSI Implementable", IEEE, 1989, pp. 246-251.

(Continued)

*Primary Examiner* — Jonathan D Gibson
(74) *Attorney, Agent, or Firm* — SU IP Consulting

(57) ABSTRACT

A failure analysis system identifies a root cause of a failure (or other health issue) in a virtualized computing environment and provides a recommendation for remediation. The failure analysis system uses a model-based reasoning (MBR) approach that involves building a model describing the relationships/dependencies of elements in the various layers of the virtualized computing environment, and the model is used by an inference engine to generate facts and rules for reasoning to identify an element in the virtualized computing environment that is causing the failure. Then, then the failure analysis system uses a decision tree analysis (DTA) approach to perform a deep diagnosis of the element, by traversing a decision tree that was generated by combining the rules for reasoning provided by the MBR approach, in conjunction with examining data collected by health monitors. The result of the DTA approach is then used to generate the recommendation for remediation.

21 Claims, 6 Drawing Sheets

(51) Int. Cl.
*G06F 11/22* (2006.01)
*G06F 11/263* (2006.01)
*G06N 5/00* (2023.01)
*G06F 16/22* (2019.01)
*G06N 5/04* (2023.01)
*G06F 9/455* (2018.01)

(52) U.S. Cl.
CPC ......... *G06F 16/2246* (2019.01); *G06N 5/003* (2013.01); *G06N 5/04* (2013.01); *G06F 11/07* (2013.01); *G06F 11/30* (2013.01)

(58) Field of Classification Search
CPC ...... G06F 9/45558; G06F 11/30; G06F 11/07; G06N 5/003; G06N 5/04
See application file for complete search history.

(56) References Cited

U.S. PATENT DOCUMENTS

2017/0180201 A1* 6/2017 Guven .................. G06N 20/00
2018/0101425 A1* 4/2018 McChord ............ G06F 11/3055
2020/0342331 A1* 10/2020 Takenouchi ........ G06F 16/2246
2021/0208983 A1* 7/2021 Lin ...................... G06N 3/0445

OTHER PUBLICATIONS

Daniel G. Bobrow, "An Overview of KRL, a Knowledge Representation Language", Cognitive Science, 1977, pp. 3-46.
Mike Chen et al., "Failure Diagnosis Using Decision Trees", IEEE, 2004, pp. 36-43.
Yingying Wang et al., "Research on Fault Diagnosis Expert System Based on the Neural Network and the Fault Tree Technology", Procedia Engineering, 2012, pp. 1206-1210. No 31.

* cited by examiner

FAILURE ANALYSIS SYSTEM FOR A DISTRIBUTED STORAGE SYSTEM

CROSS-REFERENCE TO RELATED APPLICATION

The present application claims the benefit of Patent Cooperation Treaty (PCT) Application No. PCT/CN2019/093047, filed Jun. 26, 2019, which is incorporated herein by reference.

BACKGROUND

Unless otherwise indicated herein, the approaches described in this section are not admitted to be prior art by inclusion in this section.

As the scale and complexity of distributed storage systems and other types of computing systems continue to grow, more efficient system monitoring and management techniques are needed. Traditional monitoring tools detect and report all aspects of system health (e.g., operational errors, hardware/software failures, resources that are over- or under-provisioned, etc.). Such tools may generate a large number of system events and alarms for a single root cause of the failures, and the large amount of events/alarms is difficult for a system administrator to evaluate for purposes of identifying and remedying the root cause of the failure(s).

An example would be that of a sudden power outage of a physical network switch, which in turn may cause failure issues or other operability issues with objects, hosts, network connections, virtual machine accessibility, etc. in the computing system. The symptoms of this single failure (e.g, the power outage of the switch) thus may impact the system as a whole, including triggering different layers of health and event monitoring functionalities that report operational issues via alarms.

It would be implausible for a system administrator to manually analyze all of the alarms, events, and related information in sequence in an effort to diagnose the issue(s) and to identify the root cause of the failure and a remedy. While a system administrator may be able to get some understanding of the overall issue(s) that are present, there may be too much information that needs to be analyzed in order to identify which event(s)/alarm(s) correspond to a certain failure.

DETAILED DESCRIPTION

Figure 1:
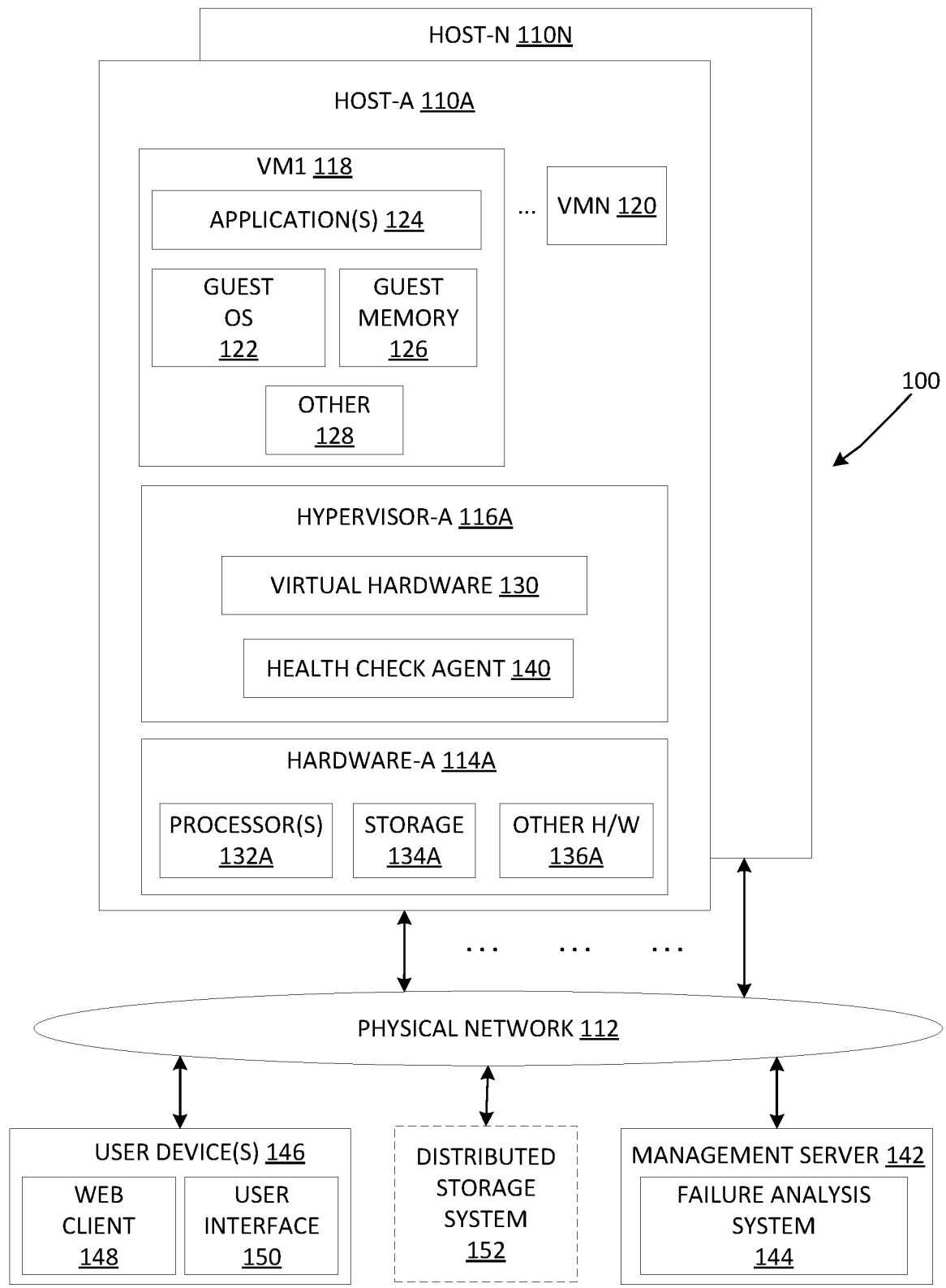
FIG. 1 is a schematic diagram illustrating an example virtualized computing environment that includes a distributed storage system and that can implement a failure analysis system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses the above-described drawbacks, by providing a failure analysis system and method that identify a root cause of a failure (or other health issue) in a computing environment and that provide a recommendation for remediation. The system and method use a model-based reasoning (MBR) approach and a decision tree analysis (DTA) approach in sequence to diagnose the failure and to provide the recommendation for remediation. The MBR approach involves building a model that describes the relationships/dependencies of the elements in the various layers of the computing environment, and the model is used by an inference engine to generate facts and rules for reasoning so as to identify an element in the computing environment that is causing the failure. Then, the DTA approach is used to perform a deep diagnosis of the element in the computing environment that is causing the failure, by traversing a decision tree that was generated by combining the rules for reasoning provided by the MBR approach, in conjunction with examining data collected by health monitors. The result of the DTA approach is then used to generate the recommendation for remediation. With such embodiments, the combination of the MBR and DTA approaches therefore provides a common framework for automated root cause analysis and remediation recommendations, with such framework capable of developing and updating over time (e.g. a capability to learn and adapt as new root causes manifest themselves in the computing environment).

Computing Environment

The technology described herein may be implemented in a virtualized computing environment in some embodiments. Virtualization allows the abstraction and pooling of hardware resources to support virtual machines in a virtualized computing environment, such as a software-defined datacenter (SDDC). For example, through server virtualization, virtual machines running different operating systems may be supported by the same physical machine (e.g., referred to as a "host"). Each virtual machine may be generally provisioned with virtual resources to run an operating system and applications. The virtual resources may include central processing unit (CPU) resources, memory resources, storage resources, network resources, etc.

The storage resources are used by a virtual machine to store data relating to the operating system and applications run by the virtual machine. In a distributed storage system, storage resources of a cluster of hosts may be aggregated to form a single shared pool of storage. Virtual machines supported by the hosts within the cluster may then access the pool of storage to store data. According to one embodiment, the methodologies described herein for failure analysis may be applied to such a distributed storage system in a virtualized computing environment.

Various implementations will now be explained in more detail using FIG. 1, which is a schematic diagram illustrating an example virtualized computing environment 100 that can implement a failure analysis system. Depending on the desired implementation, virtualized computing environment 100 may include additional and/or alternative components than that shown in FIG. 1.

Figure 2:
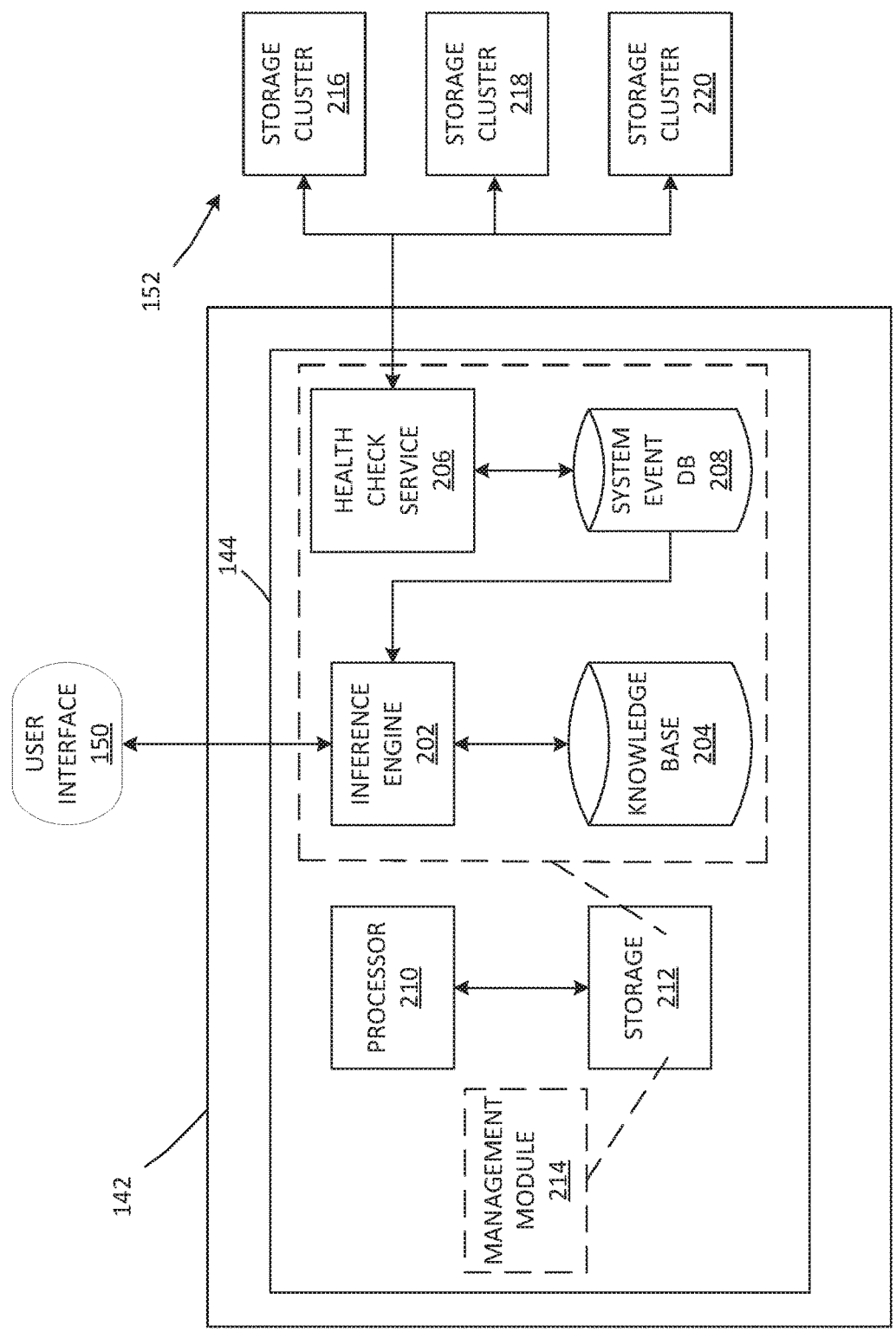
FIG. 2 is a schematic diagram illustrating an example failure analysis system that can be implemented in the virtualized computing environment of FIG. 1.

In the example in FIG. 1, the virtualized computing environment 100 includes multiple hosts, such as host-A 110A . . . host-N 110N that may be inter-connected via a physical network 112, such as represented in FIG. 2 by interconnecting arrows between the physical network 112 and host-A 110A . . . host-N 110N. The interconnected hosts may in turn form part of a cluster, wherein communications within clusters (e.g., communications between elements of one host with elements of another host), or communications between clusters, can be performed in a unicast or multicast manner. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar elements and features.

The host-A 110A includes suitable hardware-A 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a "computing devices", "host computers", "host devices", "physical servers", "server systems", "physical machines," etc.), wherein each host may be supporting tens or hundreds of virtual machines. For the sake of simplicity, the details of only the single VM1 118 is shown and described herein.

VM1 118 may include a guest operating system (OS) 122 and one or more guest applications 124 (and their corresponding processes) that run on top of the guest operating system 122. VM1 118 may also include a guest memory 126 for use by the guest operating system 122 and/or for other storage purposes. VM1 118 may include still further other elements, generally depicted at 128, such as a virtual disk and/or other elements usable in connection with operating VM1 118.

The hypervisor-A 116A may be a software layer or component that supports the execution of multiple virtualized computing instances. The hypervisor-A 116A may run on top of a host operating system (not shown) of the host-A 110A or may run directly on hardware-A 114A. The hypervisor-A 116A maintains a mapping between underlying hardware-A 114A and virtual resources (depicted as virtual hardware 130) allocated to VM1 118 and the other VMs.

The hypervisor-A 116A of one embodiment may include or support a health check agent 140 that is configured to monitor the health of the VMs running on the host-A 110A, the health of hardware-A 114A in host-A 110A, the health of host-A 110A or any of the other hosts (including the health of hardware and/or software elements of each host) in the same cluster, or the health of the cluster as a whole. Monitoring the health can include monitoring for conditions that affect could affect operation of the VMs running on the host-A 110A, of the hardware-A 114A and/or software in host-A 110A or in any of the other hosts in the same cluster, or of the cluster as a whole, such as power outages, latency, network traffic volume, processor load, storage capacity, etc. The health check agent 140 can be embodied as a service or other type of program/code that is executable to monitor these conditions.

Hardware-A 114A in turn includes suitable physical components, such as CPU(s) or processor(s) 132A; storage resources(s) 134A; and other hardware 136A such as memory (e.g., random access memory used by the processors 132A), physical network interface controllers (NICs) to provide network connection, storage controller(s) to access the storage resources(s) 134A, etc. Virtual resources (e.g., the virtual hardware 130) are allocated to each virtual machine to support a guest operating system (OS) and application(s) in the virtual machine, such as the guest OS 122 and the applications 124 (e.g., Microsoft Word, Microsoft Excel, etc.) in VM1 118. Corresponding to the hardware-A 114A, the virtual hardware 130 may include a virtual CPU, a virtual memory, a virtual disk, a virtual network interface controller (VNIC), etc.

Storage resource(s) 134A may be any suitable physical storage device that is locally housed in or directly attached to host-A 110A, such as hard disk drive (HDD), solid-state drive (SSD), solid-state hybrid drive (SSHD), peripheral component interconnect (PCI) based flash storage, serial advanced technology attachment (SATA) storage, serial attached small computer system interface (SAS) storage, integrated drive electronics (IDE) disks, universal serial bus (USB) storage, etc. The corresponding storage controller may be any suitable controller, such as redundant array of independent disks (RAID) controller (e.g., RAID 1 configuration), etc.

A distributed storage system 152 may be connected to each of the host-A 110A . . . host-N 110N in the cluster. For example, the physical network 112 may support physical and logical/virtual connections between the host-A 110A . . . host-N 110N, such that their respective local storage resources (such as the storage resource 134A of the host-A 110A and the corresponding storage resource of each of the other hosts) can be aggregated together to form the distributed storage system 152 that is accessible to and shared by each of the host-A 110A . . . host-N 110N. In this manner, the distributed storage system 152 is shown in broken lines in FIG. 1, so as to symbolically convey that the distributed storage system 152 is formed as a virtual/logical arrangement of the physical storage devices (e.g. the storage resource 134A in host-A 110A, etc.) located in the host-A 110A . . . host-N 110N. However, in addition to these storage resources, the distributed storage system 152 may also include stand-alone storage devices that may not necessarily be a part of or located in any particular host.

A management server 142 or other management entity of one embodiment can take the form of a physical computer with functionality to manage or otherwise control the operation of host-A 110A . . . host-N 110N, including operations associated with the distributed storage system 152. In some embodiments, the functionality of the management server 142 can be implemented in a virtual appliance, for example in the form of a single-purpose VM that may be run on one of the hosts in a cluster or on a host that is not in the cluster. The management server 142 may be operable to collect usage data associated with the hosts and VMs, to configure and provision VMs, to activate or shut down VMs, to monitor health conditions and diagnose and remedy operational issues that pertain to health, and to perform other managerial tasks associated with the operation and use of the various elements in the virtualized computing environment 100. The management server 142 may be a physical computer that provides a management console and other tools that are directly or remotely accessible to a system administrator or other user.

The management server 142 may include or may be otherwise coupled to at least part of a failure analysis system 144 as one of these tools. The failure analysis system 144 can be embodied as software programs or other code or tool, including some associated hardware, that is/are configured to perform failure analysis and remediation as described later below, using MBR and DTA approaches. One embodiment of the failure analysis system 144 will be described herein in the context of residing in or being part of the management server 142. In other embodiments, one or more elements of the failure analysis system 144 may reside at one of the hosts, and so the failure analysis system 144 may be operated from/by that host or may be operated by the management server 142 that acceses the one or more elements residing at that host. Further details of the failure analysis system 144 will be provided with respect to FIGS. 2-6.

The management server 142 may be communicatively coupled to host-A 110A . . . host-N 110N (and hence communicatively coupled to the virtual machines, hypervisors, hardware, etc.) via the physical network 112. The host-A 110A . . . host-N 110N may in turn be configured as a datacenter that is also managed by the management server 142. In some embodiments, the functionality of the management server 142 may be implemented in any of host-A 110A . . . host-N 110N, instead of being provided as a separate standalone device such as depicted in FIG. 1.

A user may operate a user device 146 to access, via the physical network 112, the functionality of VM1 118 . . . VMN 120, using a web client 148. The user device 146 can be in the form of a computer, including desktop computers and portable computers (such as laptops and smart phones). In one embodiment, the user may be a system administrator that also uses the web client 148 of the user device 146 to remotely communicate with the management server 142 for purposes of performing operations such as configuring, managing, diagnosing, remediating, etc. for the VMs and hosts (including the distributed storage system 152).

The user device 146 may also include a user interface 150. The user interface 150 may comprise part of the web client 148 (e.g., a web-based user interface), or may be external to the web client 148 (such as a user interface that is provided by some other application installed in the user device 146 and which can communicate with the web client 148). The system administrator may use the web client 148 and user interface 150 to communicate with the management server 142 for purposes of performing operations associated with diagnosing health issues in the virtualized computing environment 100 and performing remediation of the issues.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Failure Analysis System

FIG. 2 is a schematic diagram illustrating an example of the failure analysis system 144 that can be implemented in the virtualized computing environment 100 of FIG. 1. For example purposes, the failure analysis system 144 of FIG. 2 will be described in the context of residing in the management server 142, along with other elements of the management server 142. In other embodiments, some elements of the failure analysis system 144 need not necessarily reside in the management server 142, and instead can reside externally to (but in communication with) the management server 142. Furthermore, while FIG. 2 depicts an embodiment of the failure analysis system 144 as comprising of various elements, other embodiments may provide some of these other elements externally to the failure analysis system 144 rather than being a part of the failure analysis system.

In the embodiment of FIG. 2, the failure analysis system 144 of the management server 142 includes an inference engine 202, a knowledge base 204, a health check service 206, and a system event database 208. The management server 142 may include a processor 210, a non-transitory computer-readable storage device 212, and a management module 214. In an embodiment such as depicted in FIG. 2, one or more of the processor 210, the non-transitory computer-readable storage device 212, and the management module 214 can be included in the failure analysis system 144. These various elements of the management server 142 (including elements of the failure analysis system 144) may be operatively coupled to each other (such as depicted symbolically by the lines with arrows) so as to enable communication between the various elements.

In some embodiments, the inference engine 202, the management module 214, and/or the health check service 206 can be implemented as computer-readable instructions that are stored in the storage device 212 and executable by the processor 210. Furthermore, the knowledge base 204 and the system event database 208 may also be stored in the storage device 212. The implementation/storage of these elements in the storage device 212, in one example embodiment, is represented in the form of broken lines in FIG. 2.

The failure analysis system 144 may be operated by the system administrator at the user device 146, such as by using the user interface 150 to interact with the failure analysis system 144 in order to input a health issue (e.g., a VM is inaccessible) for analysis for a root cause of the issue and to receive a remediation recommendation. The failure analysis system 144 may be coupled (via the physical network 112) to other elements of the virtualized computing environment 100. In the example of FIG. 2, the failure analysis system 144 is in communication with the distributed storage system 152, which is in turn made up of clusters 216, 218, 220, etc. of storage devices in virtual configurations.

Figure 3:
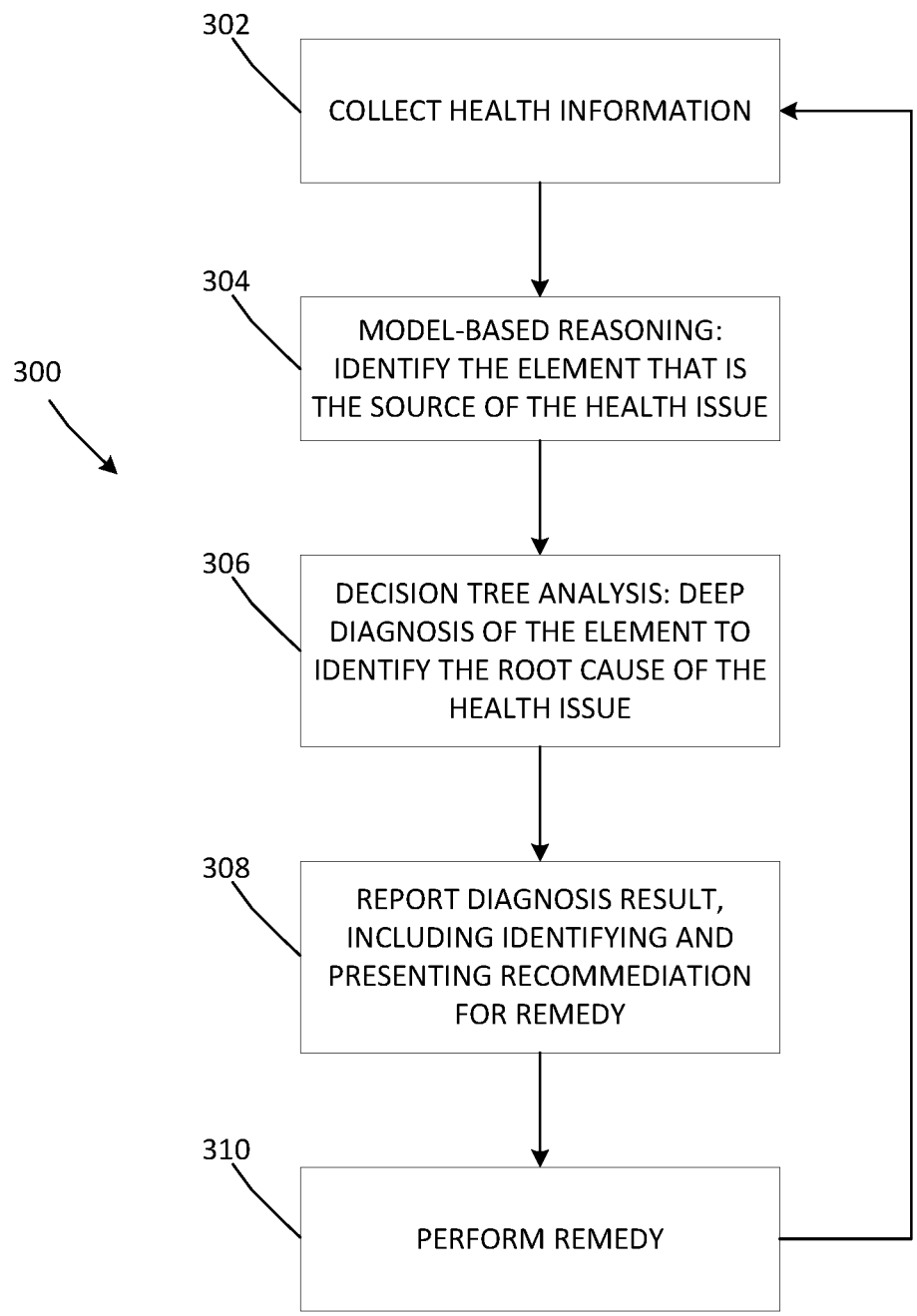
FIG. 3 is a flowchart of an example method for failure analysis using model-based reasoning and data tree analysis that can be performed by the failure analysis system of FIG. 2.

FIG. 3 is a flowchart of an example method 300 for failure analysis using model-based reasoning and data tree analysis that can be performed by the failure analysis system 144 of FIG. 2. The method 300 can be implemented in the virtualized computing environment 100 in one embodiment. In another embodiment, the method 300 can be implemented in some other type of computing environment (which may not necessarily involve a virtualized computing environment), wherein it would be beneficial to use MBR and DTA approaches. The example method 300 may include one or more operations, functions, or actions illustrated by one or more blocks, such as blocks 302 to 310. The various blocks of the method 300 and/or of any other process(es) described herein may be combined into fewer blocks, divided into additional blocks, supplemented with further blocks, and/or eliminated based upon the desired implementation.

The method 300 of FIG. 3 can be explained herein with reference to the elements shown in FIG. 2. In one embodiment, the operations of the method 300 may be performed in a pipelined sequential manner. In other embodiments, some operations may be performed out-of-order, in parallel, etc.

The method 300 may begin at a block 302 ("COLLECT HEALTH INFORMATION"), wherein the health check service 206 receives health check information from the clusters 216, 218, 220, etc. The health check service 206 may receive such health information, for example, from health check agents (e.g., the health check agent 140) that collect health information from the clusters 216, 218, 220, etc. The health check service 206 may in turn store the health information, including events and alarms pertaining to a failure, in the system event database 208.

Meanwhile, the knowledge base 204 can be embodied as a database or other data structure or collection of information. For instance, the knowledge base 204 can include configuration information for the various elements in the virtualized computing environment 100, and may also include a model of the elements in the distributed storage system 152 and/or a model of the elements in other parts of the virtualized computing environment 100. The inference engine 202 may in turn consume or otherwise process the model, in order to generate sets of facts and rules for reasoning, which may also be stored as part of the knowledge base 204 and for which examples will be provided later below. Accordingly at a block 304 ("MODEL-BASED REASONING: IDENTIFY THE ELEMENT THAT IS THE SOURCE OF THE HEALTH ISSUE") and based on the set of facts and rules for reasoning, and also based on the content in the system event database 208, the inference engine 202 can infer (e.g., deduce or otherwise identify) the particular element (e.g., VM1 118) that is the source of the failure (e.g., VM1 118 has become inaccessible).

The facts and rules for reasoning, in combination with other input information, can be used by the inference engine 202, by a system programmer, by the processor 210, and/or by some other entity to generate decision trees for the DTA approach. The decision trees may also be stored as part of the knowledge base 204.

Next at a block 306 ("DECISION TREE ANALYSIS: DEEP DIAGNOSIS OF THE ELEMENT TO IDENTIFY THE ROOT CAUSE OF THE HEALTH ISSUE"), the decision tree, along with knowledge from the knowledge base 204 that identified a particular element (e.g., VM1 118) as the source of a failure, can be used for a deep diagnosis of the specific issue (e.g., VM1 118 has become inaccessible). For instance, by traversing through the decision tree, the inference engine 202 (and/or the processor 210) can identify the root cause for the failure, for example a disk failure (e.g., a failure in the storage resource 134A).

At a block 308 ("REPORT DIAGNOSIS RESULT, INCLUDING IDENTIFYING AND PRESENTING RECOMMEDIATION FOR REMEDY"), the management module 214 may then report the diagnosis result to the user, including identifying a recommendation for a remedial action, such as "replace disk", which can be presented to the system administrator via the user interface 150. The method 300 may then repeat, by returning to the block 302.

Model-Based Reasoning (MBR)

Figure 4:
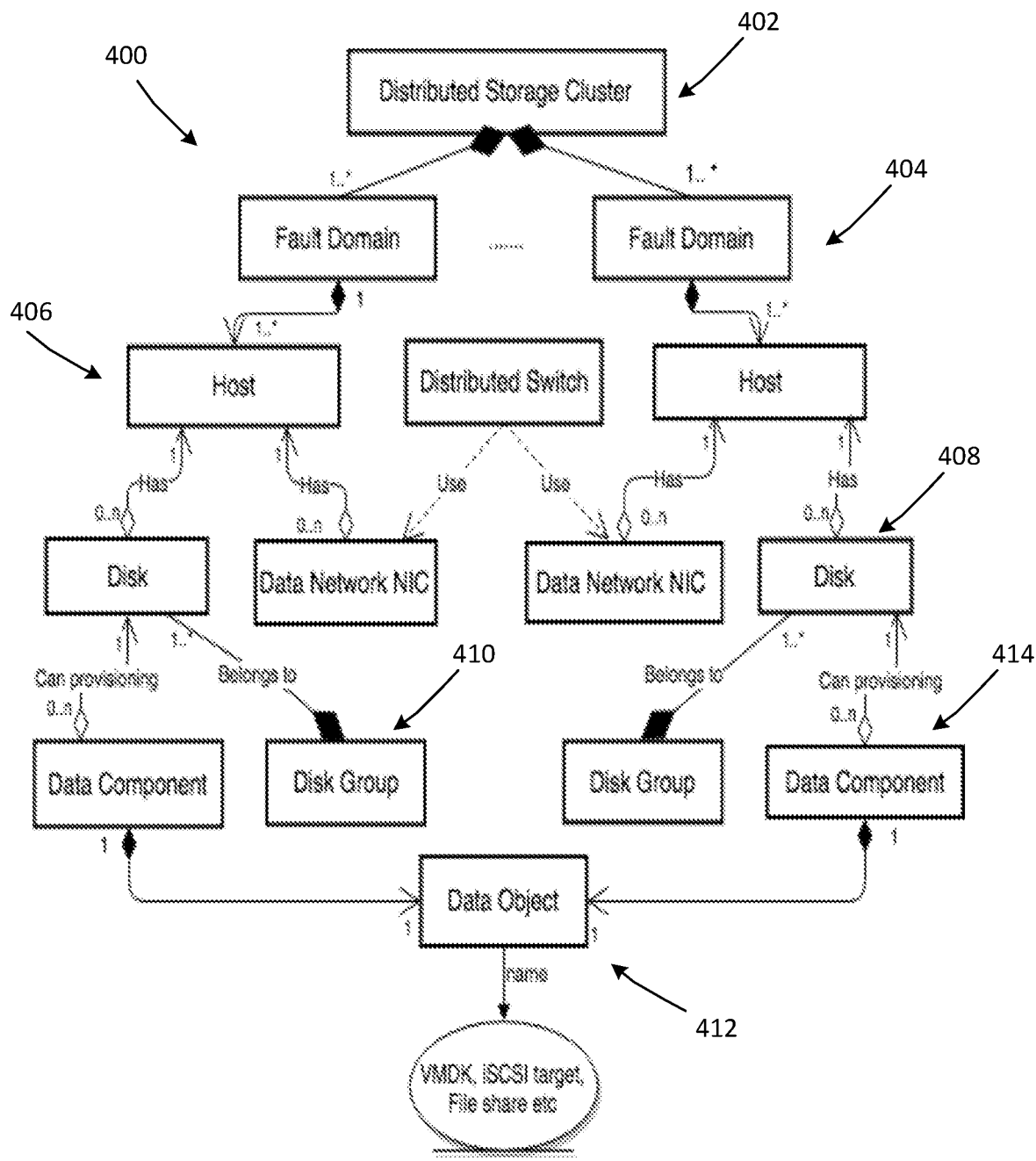
FIG. 4 is a representation of an example model that can be used for the model-based reasoning in the method of FIG. 3.
Figure 5:
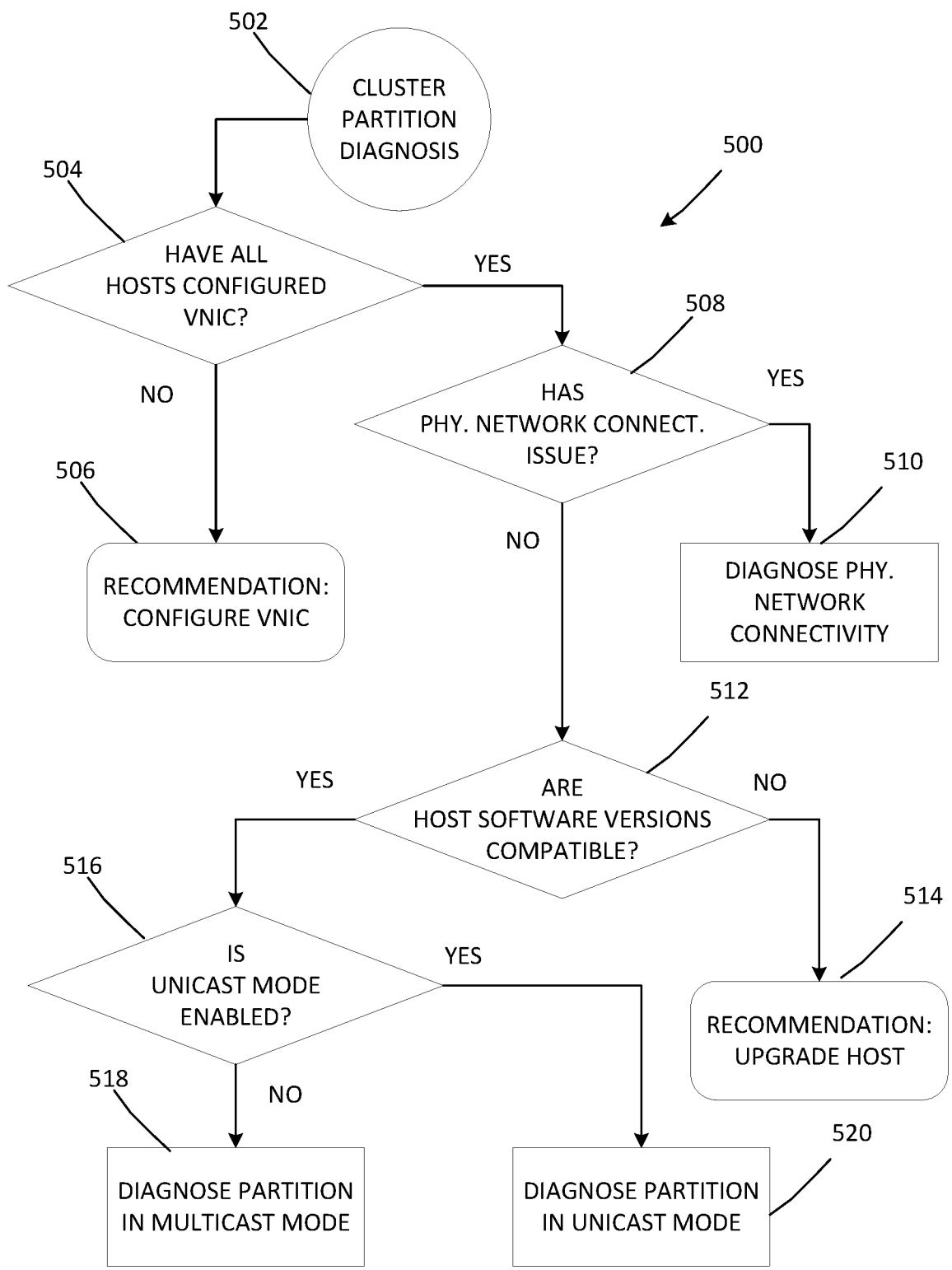
FIG. 5 is a flowchart illustrating an example decision tree for the decision tree analysis in the method of FIG. 3.
Figure 6:
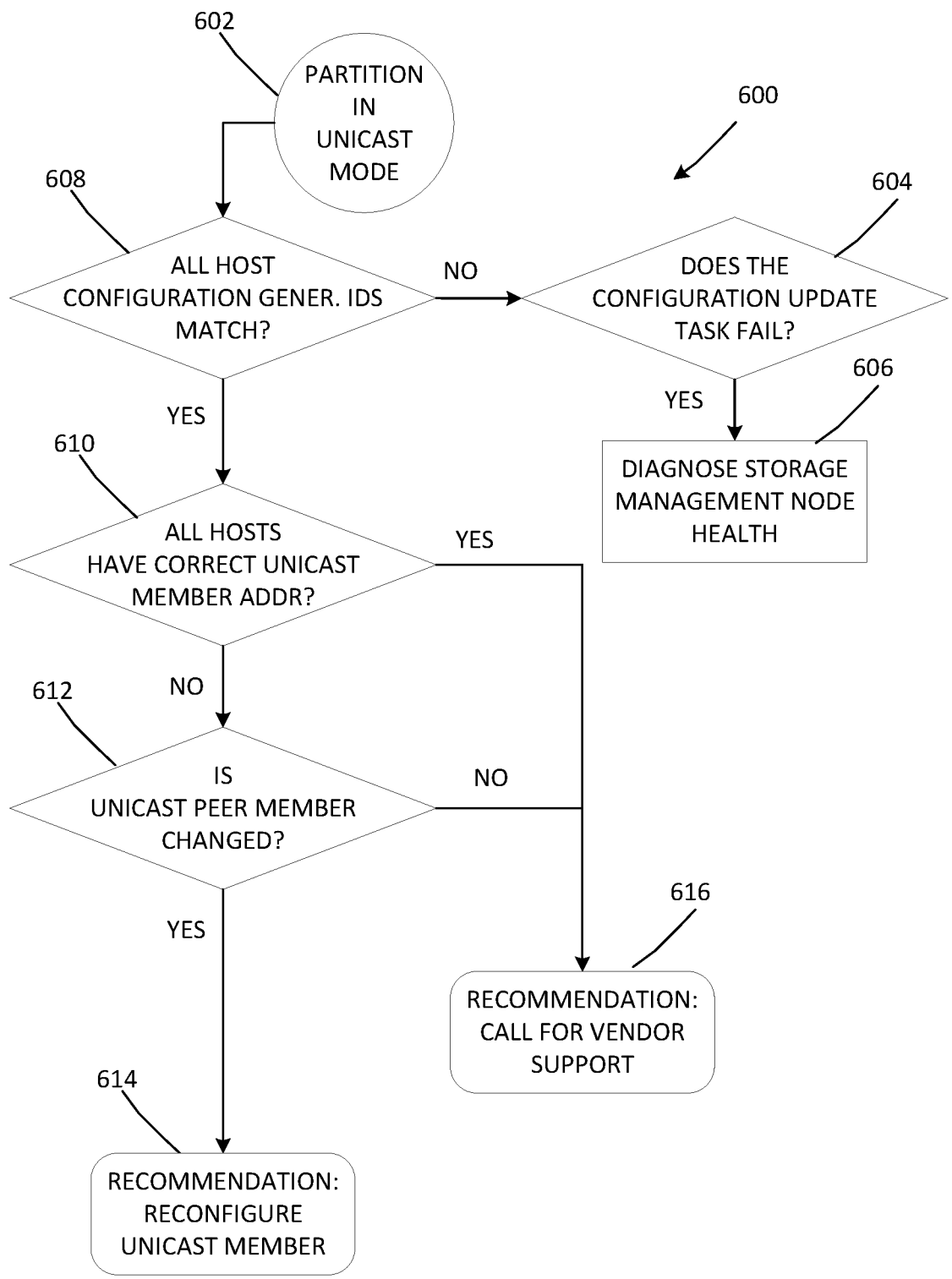
FIG. 6 is a flowchart illustrating another example decision tree for the decision tree analysis in the method of FIG. 3.

The previous discussion provided a description of the overall method and system for failure analysis. Reference will now be made with respect to FIGS. 4-6, which provide further details about the MBR and DTA approaches. Beginning first with FIG. 4, FIG. 4 is a representation of an example model 400 that can be used for the model-based reasoning in the method 300 of FIG. 3. Specifically, the model 400 depicts the components and relationships/dependencies between the various elements contained within or that form part of the distributed storage system 152.

For example, the distributed storage system 152 may be comprised of distributed clusters 402 of storage devices, which are in turn divided into multiple fault domains (FDs) 404. Each fault domain 404 may include one or more hosts 406 that contribute NICs and disks 408. The disks 408 may in turn be grouped into disk groups 410.

Data objects 412, which may be data formatted as a virtual machine disk (VMDK), an internet small computer system interface (ISCSI) target, a file share, etc., can be provisioned as data components 414 that are placed into different disks 408 of different hosts 406 that belong to different fault domains 404.

A number of automated methods may be used to generate the model 400 and other models. For example, diagnostics tools may be applied to the virtualized computing environment 100 to discover and collect information about physical elements in the virtualized computing environment 100, such as hosts, switches, NICs, storage devices, etc. Such diagnostics tools may also be used to discover and collect information about software elements in the virtualized computing environment 100, such as applications, operating systems, services, etc. Still further such diagnostics tools may identify and collect information about virtual devices and networks, and may then generate a model (such as depicted in FIG. 4) that represents how all of the above are connected and related.

Other methods may be used to generate the model. Examples include tools that generate the models based on one or more of: semantic nets, procedural representations, production rules, or frames. Automated methods may be used to generate a model, for example by using unified modeling language (UML) tools or other system design language tools.

With the model thus being generated, the inference engine 202 extracts the knowledge from the models (e.g., knowledge about the elements, structures, and interactions such as relationships and dependencies) and uses that knowledge as a foundation to infer new information. For instance, the inference engine 202 may apply logic rules to that knowledge to generate facts and rules, which may later be used in the decision tree analysis.

Taking the model 400 of FIG. 4 as an illustration, the inference engine 202 can determine the following example facts, by processing the content of the model 400:

Fact 1. Object 412's health depends on its component 414's health status, and also the components 414 should not be partitioned into disconnected fault domains 404.

Fact 2. Component 414's health depends on the health status of disk 408, host 406, and the fault domain 404 that the component 414 belongs to.

Fact 3. Fault domain 404's health requires all the hosts 406 in that FD to be connected without a partition.

Fact 4 . . . .

Next, the inference engine 202 can derive the rules for reasoning from the above facts. For example, the following example rules may be derived:

Rule 1. IF any one of the components 414 in an object 412 is not healthy, then this object will be reported in some warning status.

Rule 2. IF one disk 408 has a permanent failure, then ALL of the components 414 on this disk will be unhealthy.

Rule 3. IF two hosts 406 have a network partition issue, then ALL of the objects with component 414 placement between these two hosts will be unhealthy.

Rule 4 . . . .

Therefore in view of the above rules for reasoning, the MBR approach (through the inference engine 202) can infer that a health issue that manifests itself in a particular object 414, is due to a health issue of a certain entity like a host 406, disk 408, etc. linked to that object. Having thus identified the particular element (e.g., a host or a disk, etc.) that is the source of the health issue, the methodology then moves on to the decision tree analysis for a deep diagnosis to identify the root cause of the issue in the particular element. The DTA may in turn determine that the root cause is, for instance, damage to the disk, a power outage to the disk, etc.

Decision Tree Analysis (DTA)

The decision trees for DTA may be built based on logic and information from a number of sources. For instance, decision trees can be built by analyzing internal program logic of various elements of the virtualized computing environment 100 and/or by analyzing processes that were historically used to troubleshoot health issues reported in service requests from customers, in combination with the facts and rules for reasoning provided by the MBR approach. Such DTA building techniques may be automated.

Other automated approaches may further be used for building decision trees. With a fault injection approach, a fault is intentionally introduced into the virtualized computing environment 100 to determine the type, location, and number of failures that are generated due to the fault. These failures can then be listed and identified as having been caused by the injected fault (the root cause), and a decision tree can be auto-generated from the results of the fault injection. Still another approach may use machine learning techniques to provide a self-evolving feature, with the results of the fault injection approach being the initial starting points for the machine learning process that is used for auto-generating a decision tree.

Based on the above collection of knowledge and information/rules, Boolean logic may be used to combine groups of rules into a decision tree. An example format of a decision tree or branch thereof is the following:

IF Rule A is satisfied
  Then Apply Rule B;
  Else Apply Rule C

The decision trees (as well as the model) may be reused or extended or otherwise updated. Whenever the inference engine 202 identifies a new root cause for a particular health issue category, the rules for that new root cause can be added to the decision tree (or model) and applied for analyzing similar health issues in the future. The inference engine 202 itself can be built and updated in an automated manner. For example, the results of decision trees, updates to models, machine learning techniques, fault injection results, etc. may be used to develop and update the knowledge base and logic base of the inference engine 202 dynamically over time.

To better illustrate details of the DTA approach, specific use examples will now be provided with respect to FIGS. 5 and 6. Specifically and beginning with FIG. 5, FIG. 5 shows an example decision tree 500 for diagnosing the root cause of a cluster partition. The inference engine 202 (and/or the processor 210) may navigate through the branches of the decision tree 500. The diamond blocks represent rules that will decide which branch to drill down further depending on the result of evaluating the rule. The rounded rectangular blocks represent a recommendation that a user may follow for remediation. The non-rounded rectangular blocks represent further decision trees that are to be traversed in order to arrive at a decision/resolution.

Generally speaking, a cluster partition involves a situation where there is a fault/failure in one storage device that forms a cluster with other storage devices. The result of the cluster partition is that data may be incorrectly replicated or may be otherwise inconsistent/erroneous/incomplete between the storage devices. The diagnosis and remediation of a cluster partition issue will be described here purely for example purposes. The MBR and DTA approaches can be applied to any other storage-operation-related issue in the distributed storage system 152.

At a block 502 ("CLUSTER PARTITION DIAGNOSIS"), the user may use the user interface 150 to initiate a diagnosis of a cluster, due to a health issue that has manifested, such as a host becoming inaccessible. At block 504 ("HAVE ALL HOSTS CONFIGURED VNIC?"), the inference engine 202 determines whether there are correct configuration settings in each host, such as VNIC settings etc. If the inference engine 202 determines (from the contents of the system event database 208 and/or from configuration settings stored in the knowledge base 204) that the configuration settings are incorrect or missing (e.g., "NO" in the block 504), then the inference engine 202 cooperates with the management module 214 to present a recommendation to the user at block 506 ("RECOMMENDATION: CONFIGURE VNIC") via the user interface 150.

However, if at a block 504, the inference engine 202 determines that the configuration settings are correct (e.g., "YES" at the block 504), then the inference engine 202 proceeds to block 508 ("HAS PHYSICAL NETWORK CONNECTIVITY ISSUE?"), wherein if the answer is "YES", then the inference engine 202 cooperates with the health check service 206 and the system event database 208 to diagnose the issue at a block 510 ("DIAGNOSE PHYSICAL NETWORK CONNECTIVITY").

If the answer at the block 508 is "NO", then the inference engine 202 moves to the block 512 ("ARE HOST SOFTWARE VERSIONS COMPATIBLE") to check for software compatibility in the hosts. If the software is determined to be incompatible in a particular host (e.g., "NO" in the block 512), then the inference engine 202 cooperates with the management module 214 to present a recommendation to the user at block 514 ("RECOMMENDATION: UPGRADE HOST") via the user interface.

If the answer at the block 512 is "YES" (e.g., software is compatible amongst the hosts), then the inference engine moves to a block 516 ("IS UNICAST MODE ENABLED?") to determine whether to perform further diagnosis in multicast mode at a block 518 ("DIAGNOSE PARTITION IN MULTICAST MODE") or to perform further diagnosis in unicast mode at a block 520 ("DIAGNOSE PARTITION IN UNICAST MODE"). At this point, the inference engine 202 has determined that there is a cluster partition that is present in either the unicast mode or the multicast mode. These deployment modes operate in different ways, and so a further decision tree needs to be traversed depending on the deployment mode that is currently implemented.

As such, FIG. 6 is a flowchart illustrating an example decision tree 600 for the decision tree analysis in the method 300 of FIG. 3, for diagnosing a cluster partition in unicast mode. Beginning at a block 602 ("PARTITION IN UNI- CAST MODE"), the user has operated the user interface 150 to initiate a diagnosis by the inference engine 202 for the unicast mode. At a block 608 ("ALL HOST CONFIGURATION GENERATION IDS MATCH?), the inference engine 202 checks the configuration settings in the knowledge base 204 for matching configuration settings between the two hosts.

If the inference engine 202 determines that the configuration settings are mismatched (e.g., "NO" at the block 608), then the inference engine 202 triggers a configuration update task and checks at a block 604 ("DOES THE CONFIGURATION UPDATE TASK FAIL?") as to whether the configuration update task has solved the cluster partition issue. If the problem is not solved (e.g., "YES" at the block 604), then the inference engine 202 would traverse another decision tree to diagnose another component (up or down) in the model hierarchy. In this example, the next decision tree would involve the diagnosis of a storage management node at a block 606 ("DIAGNOSE STORAGE MANAGEMENT NODE HEALTH").

If, back at the block 608, the inference engine 202 determines that the configuration settings are matched (e.g., "YES" at the block 608), then the inference engine 202 moves to a block 610 ("ALL HOSTS HAVE CORRECT UNICAST MEMBER ADDRESS?") to determine whether the hosts have the correct unicast member address. If the member address is correct (e.g., "YES" at the block 610), then the inference engine 202 cooperates with the management module 214 to present a recommendation to the user at a block 616 ("RECOMMENDATION: CALL FOR VENDOR SUPPORT") since further outside guidance appears to be needed in order to identify the root cause.

Back at the block 610, the inference engine 202 may determine that the hosts have incorrect unicast member addresses (e.g., "NO" at the block 610). This may be due to one of the peer unicast members having been changed or some other reason that is causing the incorrect/inconsistent member address. So, the inference engine 202 traverses to a block 612 ("IS UNICAST PEER MEMBER CHANGED?") to determine if there was a change in a member. If no change (e.g., "NO" at the block 612), then this means that the same peer members are connected and there is some other reason that is causing the cluster partition. The inference engine 202 thus moves to the block 616 to recommend contacting for outside support.

However, if the inference engine 202 has determined that there was a change of a peer member (e.g., "YES" at the block 612), then the inference engine 202 in cooperation with the management module 214 presents a recommendation to the user via the user interface 150, at a block 614 ("RECOMMENDATION: RECONFIGURE UNICAST MEMBER"), to indicate that a remedy would be to reconfigure one of the unicast peer members to have matching addresses/configurations relative to the other unicast peer member.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 2 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term "processor" is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to perform failure analysis using model-based reasoning in combination with a decision tree analysis.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other computer-readable instruction to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to address health issues indicative of operating conditions in a virtualized computing environment that includes at least one host, the method comprising:
   monitoring, by a health check agent installed at the at least one host, health of the virtualized computing environment;
   detecting, based on health check information provided by the health check agent from the monitoring, a health issue that has manifested in the virtualized computing environment;
   generating, by an automated tool, a model that represents elements at multiple layers of the virtualized computing environment, and connections and relationships between the elements;
   using model-based reasoning to identify an element, amongst the elements, in the virtualized computing environment that is a source of the health issue,
   wherein the model-based reasoning uses the model, representing the connections and the relationships between the elements in the virtualized computing environment, to determine facts and rules for identification of the element that is the source of the health issue;
   using a decision tree analysis to identify a root cause of the health issue at the identified element, wherein a decision tree for use in the decision tree analysis is generated by injecting a fault into the virtualized computing environment to determine types, locations, and number of failures that are generated in the virtualized computing environment due to the injected fault;
   based on a result of the decision tree analysis that identifies the root cause of the health issue, generating a recommendation for remediation of the health issue; and
   performing the recommended remediation of the health issue.

2. The method of claim 1, wherein the automated tool comprises a diagnostics tool, and wherein generating the model includes applying the diagnostics tool to the virtualized computing environment to discover and collect information about the elements in the virtualized computing environment.

3. The method of claim 1, wherein the decision tree, for use in the decision tree analysis, is further generated by one or more of:
   using results of the injected fault as starting points for a machine-learning technique to evolve the decision tree;
   analyzing internal program logic of the elements in the virtualized computing environment; or
   analyzing processes that were historically used to troubleshoot health issues that were reported in the virtualized computing environment.

4. The method of claim 1, wherein the elements in the virtualized computing environment include elements of a distributed storage system that are arranged in storage clusters, and wherein at least one of the health issues includes a cluster partition issue or other storage-operation-related issue in the distributed storage system.

5. The method of claim 1, wherein using the decision tree analysis to identify the root cause of the health issue includes evaluating the health check information and configuration information while traversing a branch of the decision tree.

6. The method of claim 1, wherein:
   the facts determined from the model are used to generate the rules, and
   the rules are combined to form the decision tree for the decision tree analysis.

7. The method of claim 1, further comprising updating either or both the model and the decision tree for the decision tree analysis, in response to identifying a new root cause associated with a particular health issue, so that the updated model or the updated decision tree are usable to analyze other health issues that are similar to the particular health issue.

8. A non-transitory computer-readable medium having instructions stored thereon, which in response to execution by one or more processors, cause the one or more processors to perform or control performance of operations to address health issues indicative of operating conditions in a virtualized computing environment that includes at least one host, the operations comprising:
   monitoring, by a health check agent installed at the at least one host, health of the virtualized computing environment;
   detecting, based on health check information provided by the health check agent from the monitoring, a health issue that has manifested in the virtualized computing environment;
   generating, by an automated tool, a model that represents elements at multiple layers of the virtualized computing environment, and connections and relationships between the elements;
   using model-based reasoning to identify an element, amongst the elements, in the virtualized computing environment that is a source of the health issue,
   wherein the model-based reasoning uses the model, representing the connections and the relationships between the elements in the virtualized computing environment, to determine facts and rules for identification of the element that is the source of the health issue;
   using a decision tree analysis to identify a root cause of the health issue at the identified element, wherein a decision tree for use in the decision tree analysis is generated by injecting a fault into the virtualized computing environment to determine types, locations, and number of failures that are generated in the virtualized computing environment due to the injected fault;
   based on a result of the decision tree analysis that identifies the root cause of the health issue, generating a recommendation for remediation of the health issue; and
   performing the recommended remediation of the health issue.

9. The non-transitory computer-readable medium of claim 8, wherein the automated tool comprises a diagnostics tool, and wherein generating the model includes applying the diagnostics tool to the virtualized computing environment to discover and collect information about the elements in the virtualized computing environment.

10. The non-transitory computer-readable medium of claim 8, wherein the decision tree, for use in the decision tree analysis, is further generated by one or more of:

using results of the injected fault as starting points for a machine-learning technique to evolve the decision tree;
analyzing internal program logic of the elements in the virtualized computing environment; or
analyzing processes that were historically used to troubleshoot health issues that were reported in the virtualized computing environment.

11. The non-transitory computer-readable medium of claim 8, wherein the elements in the virtualized computing environment include elements of a distributed storage system that are arranged in storage clusters, and wherein at least one of the health issues includes a cluster partition issue or other storage-operation-related issue in the distributed storage system.

12. The non-transitory computer-readable medium of claim 8, wherein using the decision tree analysis to identify the root cause of the health issue includes evaluating the health check information and configuration information while traversing a branch of the decision tree.

13. The non-transitory computer-readable medium of claim 8, wherein:
the facts determined from the model are used to generate the rules, and
the rules are combined to form the decision tree for the decision tree analysis.

14. The non-transitory computer-readable medium of claim 8, wherein the operations further comprise:
updating either or both the model and the decision tree for the decision tree analysis, in response to identifying a new root cause associated with a particular health issue, so that the updated model or the updated decision tree are usable to analyze other health issues that are similar to the particular health issue.

15. A system to address health issues indicative of operating conditions in a virtualized computing environment that includes at least one host, the system comprising:
a health check agent installed at the at least one host and configured to monitor health of the virtualized computing environment;
a management server configured to detect, based on health check information provided by the health check agent, a health issue that has manifested in the virtualized computing environment;
an automated tool configured to generate a model that represents elements at multiple layers of the virtualized computing environment, and connections and relationships between the elements; and
a failure analysis system, coupled to the management server, configured to use model-based reasoning to identify an element, amongst the elements, in the virtualized computing environment that is a source of the health issue, wherein:
the model-based reasoning uses the model, representing the connections and the relationships between the elements in the virtualized computing environment, to determine facts and rules for identification of the element that is the source of the health issue,
the failure analysis system is further configured to use a decision tree analysis to identify a root cause of the health issue at the identified element, wherein a decision tree for use in the decision tree analysis is generated by the management server by injection of a fault into the virtualized computing environment to determine types, locations, and number of failures that are generated in the virtualized computing environment due to the injected fault,
based on a result of the decision tree analysis that identifies the root cause of the health issue, the failure analysis system is configured to generate a recommendation for remediation of the health issue; and
the management server is further configured to perform the recommended remediation of the health issue.

16. The system of claim 15, wherein the automated tool comprises a diagnostics tool, and wherein the management server is further configured to generate the model by application of the diagnostics tool to the virtualized computing environment to discover and collect information about the elements in the virtualized computing environment.

17. The system of claim 15, wherein the management server is configured to generate the decision tree, for use in the decision tree analysis, further by one or more of:
use of results of the injected fault as starting points for a machine-learning technique to evolve the decision tree;
analysis of internal program logic of the elements in the virtualized computing environment; or
analysis of processes that were historically used to troubleshoot health issues that were reported in the virtualized computing environment.

18. The system of claim 15, wherein the elements in the virtualized computing environment include elements of a distributed storage system that are arranged in storage clusters, and wherein at least one of the health issues includes a cluster partition issue or other storage-operation-related issue in the distributed storage system.

19. The system of claim 15, wherein to use the decision tree analysis to identify the root cause of the health issue, the failure analysis system is configured to evaluate the health check information and configuration information while traversing a branch of the decision tree.

20. The system of claim 15, wherein:
the facts determined from the model are used to generate the rules, and
the rules are combined to form the decision tree for the decision tree analysis.

21. The system of claim 15, wherein the failure analysis system is further configured to update either or both the model and the decision tree for the decision tree analysis, in response to identification of a new root cause associated with a particular health issue, so that the updated model or the updated decision tree are usable to analyze other health issues that are similar to the particular health issue.

* * * * *